United States Patent [19]

Youmans

[11] 4,062,582
[45] Dec. 13, 1977

[54] TRUCK CONSTRUCTION
[75] Inventor: Donald W. Youmans, San Jose, Calif.
[73] Assignee: FMC Corporation, San Jose, Calif.
[21] Appl. No.: 683,134
[22] Filed: May 4, 1976
[51] Int. Cl.² ............................................. B62D 33/06
[52] U.S. Cl. ............................... 296/28 C; 180/89.12; 296/63; 296/146
[58] Field of Search .................... 296/28 M, 28 C, 63, 296/146; 180/77 S, 89.12, 49; 280/166

[56] References Cited
U.S. PATENT DOCUMENTS

| | | | |
|---|---|---|---|
| 2,542,605 | 2/1951 | Werner | 296/146 |
| 2,822,214 | 2/1958 | Rivolta | 296/146 |
| 2,878,054 | 3/1959 | Linder | 296/146 |
| 3,275,370 | 9/1966 | Smith | 296/63 |
| 3,455,407 | 7/1969 | Phillips | 180/49 |
| 3,802,530 | 4/1974 | Purcell | 296/28 C |
| 3,981,515 | 9/1976 | Rosborough | 280/166 |

Primary Examiner—Joseph F. Peters, Jr.
Assistant Examiner—John A. Carroll
Attorney, Agent, or Firm—R. S. Kelly; C. E. Tripp

[57] ABSTRACT

A truck which is designed to utilize its design length to the maximum effectiveness. The truck includes a frame upon which are mounted an elongated cargo bed and a cab for the operator at the forward end thereof. The power plant for the truck is located rearwardly of the cab near the center of the vehicle so that space will not be required at the front of the vehicle as in conventional truck constructions. The cab sits between the laterally spaced front wheels, and access thereto is provided by a door which is located in the front face of the cab whereby the cab may be entered and exited without climbing over the front wheels and enclosing fender structures.

2 Claims, 3 Drawing Figures

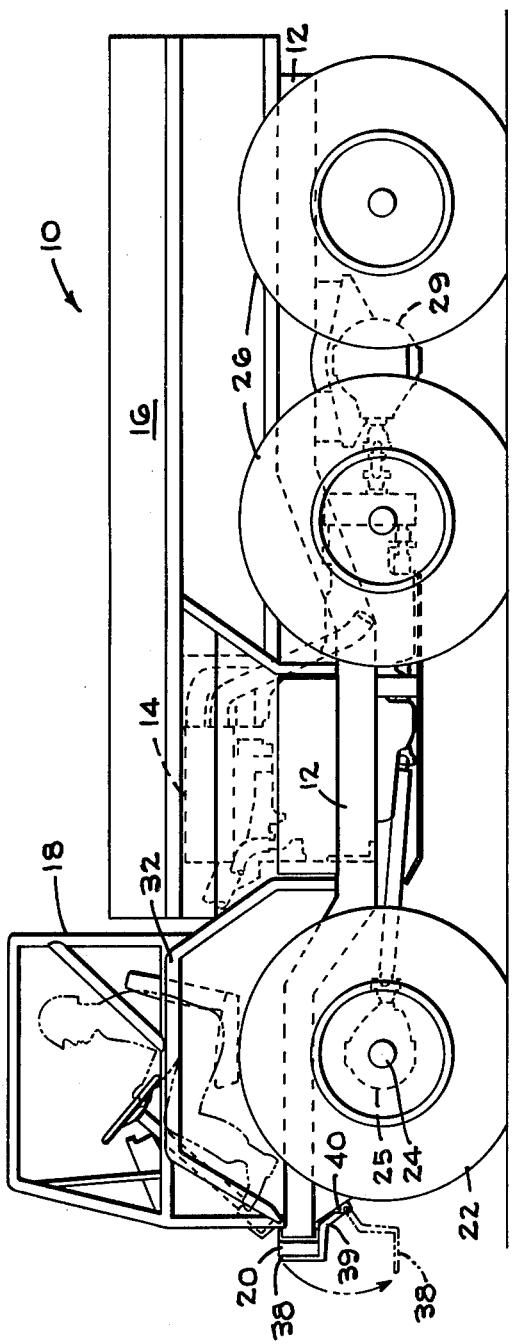

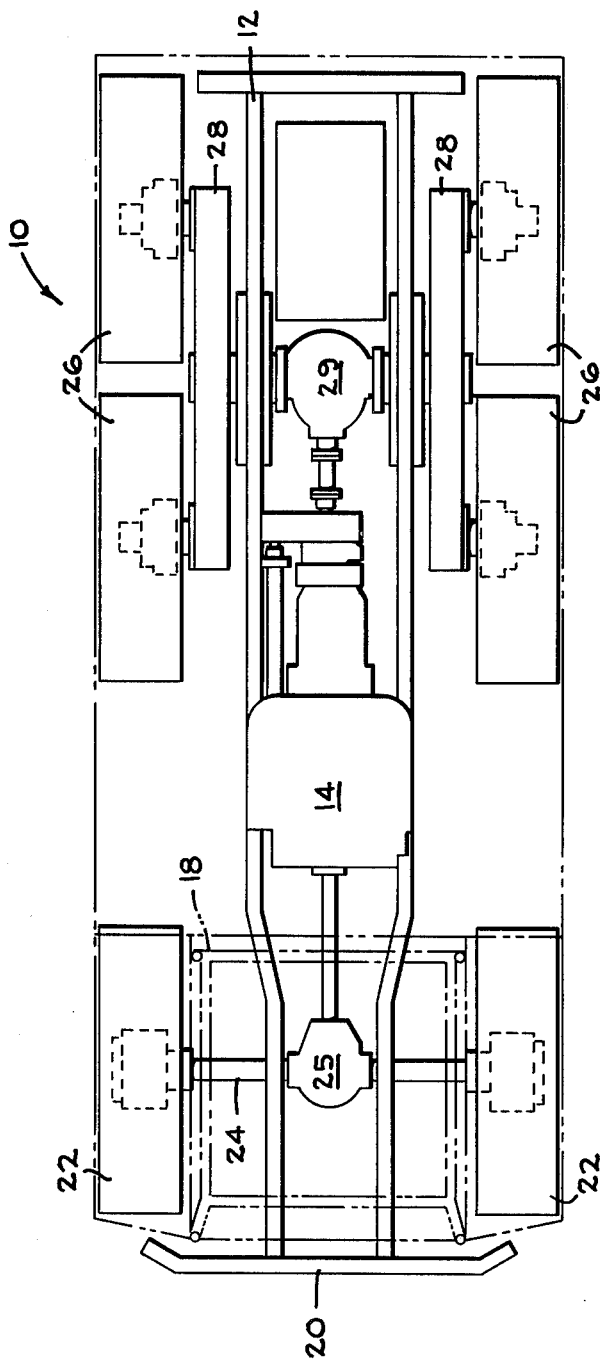

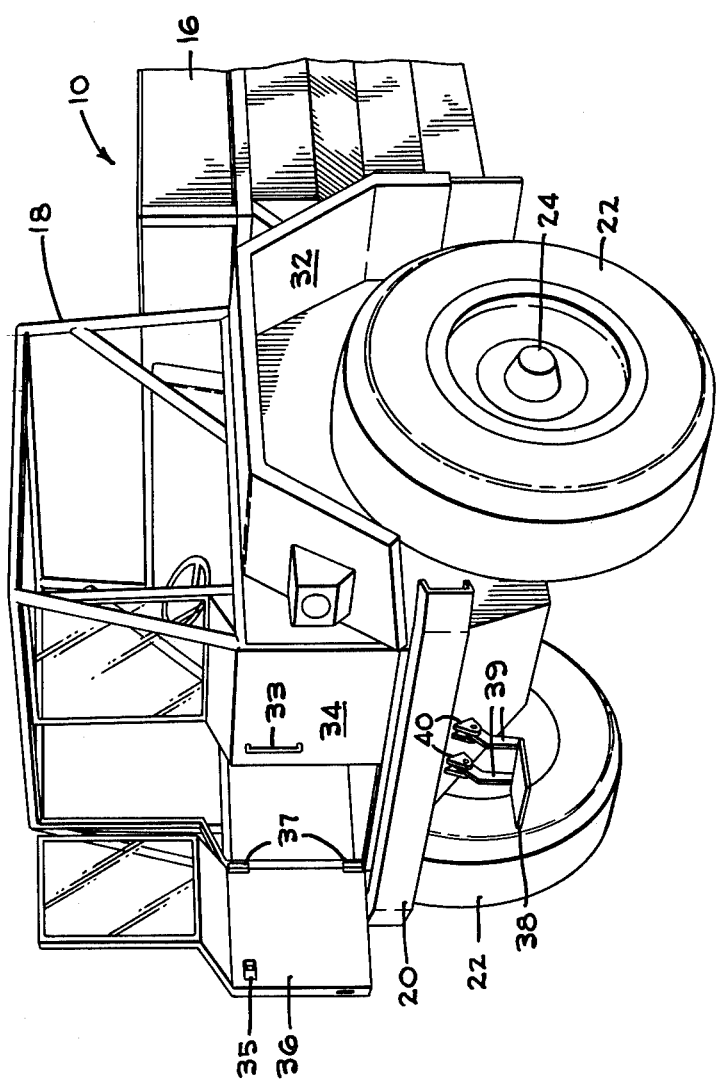

TRUCK CONSTRUCTION

The invention herein described was made in the course of or under a contract with the Department of the Army.

BACKGROUND OF THE INVENTION

1. Field of the Invention

The present invention pertains to truck constructions, and more particularly, it pertains to high mobility trucks which are designed to operate in rough and uneven terrain but which must maintain maximum cargo carrying capacity.

2. Description of the Prior Art

As is well known, motor vehicles including trucks generally have the drive motor and transmission located at the forward end of the vehicle. However, in order to get better weight distribution, or to permit the driver's cab to be positioned directly adjacent to the front of the vehicle, many prior art motor vehicles have adapted a drive arrangement wherein the engine and transmission are placed midway along the frame of the vehicle.

In trucks or other large vehicles, including those having an engine located rearwardly of the front of the vehicle, the cab is provided over the front wheels if the wheels are relatively small, but it is typically provided rearwardly of the front wheels if the wheels are large enough so as to hinder the accessibility to the cab with its conventional side door arrangement. This is especially true in off-the-road trucks or other vehicles wherein the tires are large in order to provide the needed tractive effort and must be suspended so as to accommodate a great deal of vertical movement relative to the frame of the vehicle. It will be noted, however, that if the cab is placed rearwardly of the wheels, the necessary overall length of the vehicle frame will be extended thereby adding to the weight and cost of the vehicle without attaining any cargo carrying or maneuverability advantages.

SUMMARY OF THE INVENTION

With the truck construction of the present invention maximum use of the truck body frame is utilized. The cab is placed at the very front of the vehicle between the front wheels, and the cargo bed extends from a position directly adjacent to the rear of the cab on out to the rear end of the vehicle. The cab may be made just large enough to contain the driver and a passenger, or passengers, and the necessary steering wheel, control panel and other vehicle control devices. It is an essential feature of the present invention that accessibility be provided to the cab through the front transversely extending face of the vehicle, and a hinged door is provided for this purpose. Thus, the driver enters and exits the truck over the front bumper thereof.

BRIEF DESCRIPTION OF THE DRAWINGS

FIG. 1 is a diagrammatic side elevation of the truck of the present invention.

FIG. 2 is a diagrammatic plan of the truck of FIG. 1 particularly showing the drive arrangement and its relationship to the cab and frame structures of the truck.

FIG. 3 is a perspective of the front portion of the truck of FIG. 1 particularly showing the cab and the means of access thereto.

DESCRIPTION OF THE PREFERRED EMBODIMENT

As seen in FIG. 1, the truck 10 of the present invention includes an elongated frame structure 12 which is provided with a downward dip near the central portion thereof in order to accommodate the power plant 14 for the vehicle which includes the conventional motor and transmission. The major portion of the vehicle is occupied by a cargo bed 16 which extends from the rear of the vehicle. Located directly adjacent to the forward end of the cargo bed 16 is a cab 18 which thus sits at the very front of the vehicle adjacent a front bumper 20. The frame 12 is supported by a pair of front wheels 22 which are rotatably connected to an axle 24 (FIG. 2) extending transversely across the vehicle directly beneath the cab 18. Although not shown, it will be recognized that the frame can be supported upon the axle by any suitable suspension system. However, a preferred suspension system is shown in my copending application filed on even date herewith and entitled Vehicle Wheel Suspension With Roll Freedom, Ser. No. 683,133. Drive to the front wheels 22 is provided by a differential 25 which delivers power to the axle 24. Opposed tandem pairs of rear wheels 26 are mounted upon conventional walking beam suspensions 28 and are connected so as to receive power from a rear differential 29 in a conventional manner. Both the forward differential 25 and the rear differential 29 are powered from the power plant 14 as shown in FIG. 2.

Since the truck 10 of the present invention is designed primarily for off-the-road operating conditions where various obstacles are encountered, it is essential that the front wheels be capable of maximum vertical deflection relative to the frame of the vehicle. Thus, fenders 32 are provided in positions extending outwardly from the cab 18 and spaced well above the top of the wheels 22. The suspension system of my aforementioned copending patent application can be used to permit such relative movement between the front wheels and the frame.

The cab comprises a tubular steel frame structure as shown which will be seen to be generally rectangular in shape. As best shown in FIG. 3, the front of the cab comprises a transversely extending face which includes a fixed panel 34 and a door 36 which is hinged to one side of the cab by hinges 37. A conventional door latch 35 secures the door to the fixed panel, and a handle 33 is provided on the face of the fixed panel to aid the driver in climbing into the cab. In order to further aid the driver in entering and leaving the cab, a step 38 is provided adjacent the front of the vehicle, such step being hingedly mounted to the frame of the vehicle by a pair of spaced support arms 39 and mounting brackets 40. Thus, when one wishes to enter the truck, the step 38 is moved from its "up" position, as shown in FIG. 1, into its lowered position, as shown in FIG. 3. The operator of the vehicle can then climb upon the step and the bumper 20 to find an easy access to the cab.

It will be seen that the cab 18 affords the driver excellent all-around vision.

Although the best mode contemplated for carrying out the present invention has been herein shown and described, it will be apparent that modification and variation may be made without departing from what is regarded to be the subject matter of the invention.

What I claim is:

1. A truck comprising a frame, a pair of laterally spaced front wheels supporting the front end of the frame and a pair of laterally spaced rear wheels supporting the rear end of the frame, a cargo bed supported upon said frame and extending from the rear end of the frame to a position spaced just rearwardly of said front wheels, said cargo bed extending transversely of said truck at least substantially to the planes defined by the outer sides of said front and rear wheels, a cab supported by said frame between said front wheels and extending from said cargo bed to the front end of the frame, said cab being separate from said cargo bed and being separately mounted on said frame from said cargo bed, said front wheels extending upwardly in generally parallel relationship to and past at least a portion of the sides of said cab, said cab having a front face at said front end of the frame extending generally transversely of said frame, said front face of the cab extending in a generally vertical plane substantially from one side of said frame to the other side thereof, said front wheels extending forwardly to a position substantially adjacent said vertical transverse plane of said front face of the cab, and a single door only being provided in said front face of the cab to allow access to the cab directly from the front of the truck, said door being provided on the side of said cab opposite to the driver's side, said door being hinged about a vertical axis in said plane so as to swing outwardly of said cab at the front thereof.

2. A truck according to claim 1 including a fender positioned above each of said front wheels and extending laterally outwardly from said cab, said fenders extending forwardly to said generally vertical plane of said front face of the cab, said fenders being spaced far enough above each of said front wheels so as to permit said wheels to move upwardly relative to said frame enough so that said front wheels may move over obstacles while said frame remains in a generally level and stable position.

* * * * *